Aug. 20, 1946.   R. L. LEVY   2,406,304
DEVICE AND SYSTEM FOR THE BRAKING OF VEHICLES
Filed May 4, 1943   3 Sheets-Sheet 2

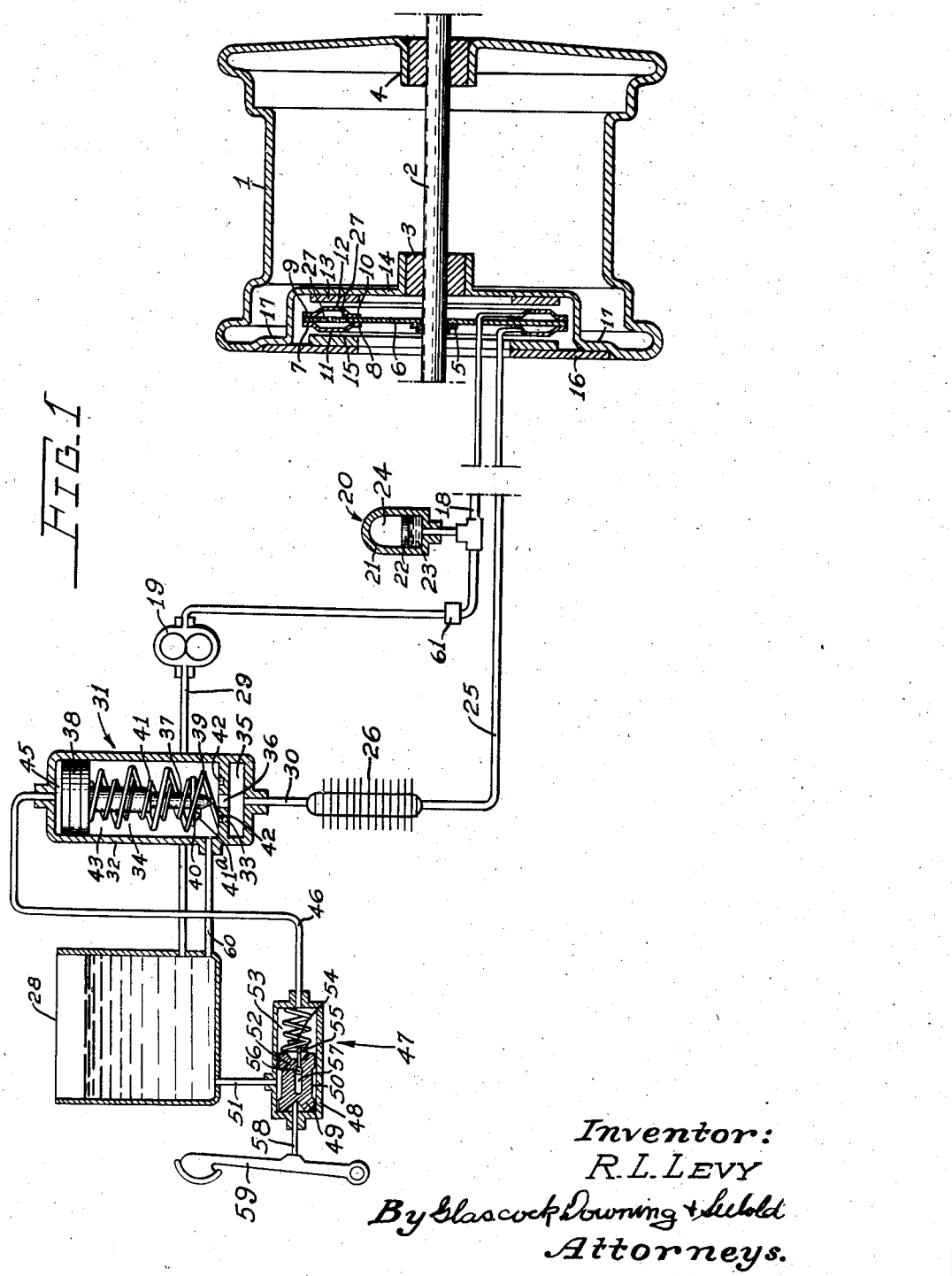

Inventor:
R. L. LEVY
Attorneys.

Aug. 20, 1946.    R. L. LEVY    2,406,304
DEVICE AND SYSTEM FOR THE BRAKING OF VEHICLES
Filed May 4, 1943    3 Sheets-Sheet 3
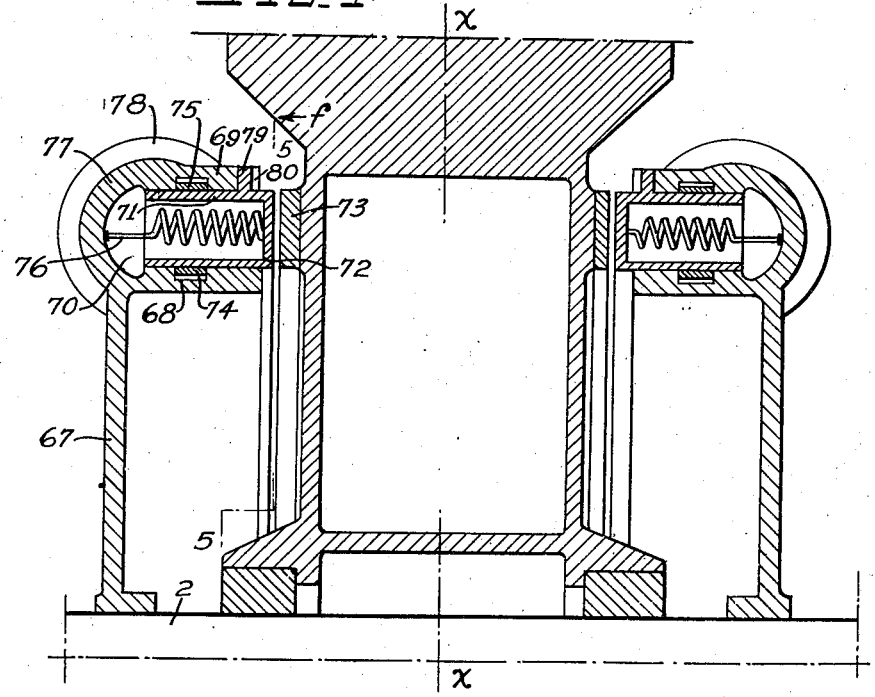
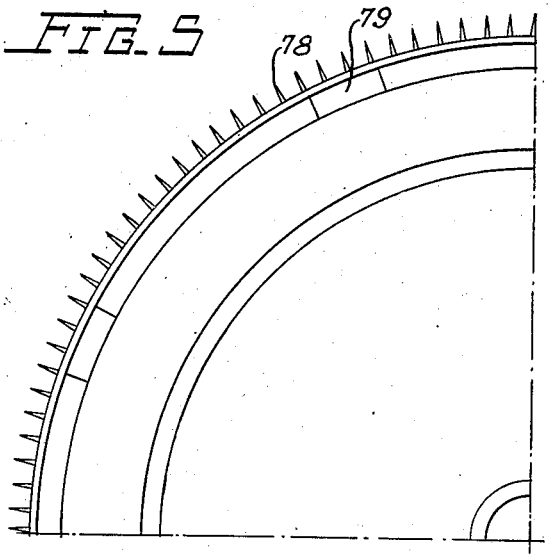
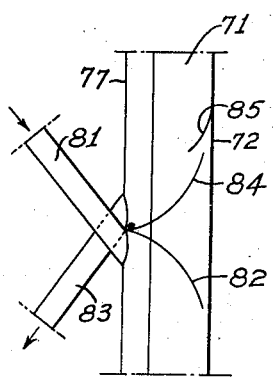
Inventor:
R. L. Levy
By Glascock, Downing & Seebold
Attorneys.

Patented Aug. 20, 1946

2,406,304

UNITED STATES PATENT OFFICE 2,406,304

DEVICE AND SYSTEM FOR THE BRAKING OF VEHICLES

René Lucien Levy, Paris, France, assignor to Societe D'Inventions, Aeronautiques et Mecaniques S. I. A. M., Geneva, Switzerland Application May 4, 1943, Serial No. 485,665
In France June 7, 1941

4 Claims. (Cl. 188—152)

This invention relates to braking mechanism of the type used in connection with vehicles and has for its object to provide an improved brake system wherein fluid is utilized as a medium for applying the brakes, the system including a liquid reservoir and manually operably controlled means for regulating the application of fluid pressure.

In the following description, made by way of example, reference is made to the diagrammatic drawings attached, in which:

Fig. 1 is a general view of a braking system according to the invention, the wheel being shown in axial section;

Fig. 4 shows, on a larger scale, in axial section, half of a further modified form of wheel equipped with a brake according to the invention;

Fig. 5 is a front view of this wheel in section along line 5—5 following the direction of arrow f, only a quarter of the wheel being shown;

Fig. 6 shows diagrammatically the device provided for the circulation of the liquid in the wheel according to this modification.

Figure 3:
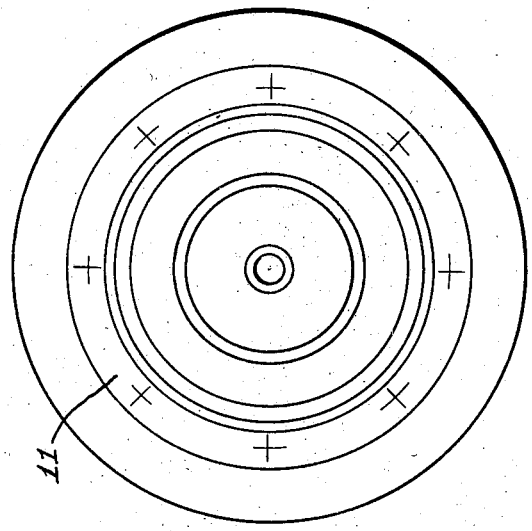
Fig. 3 is a front view of one of the said wheels, the circular plate being supposed removed in order to show the part with deformable wall.

Reference is made first to Figs. 1 and 3. The wheel 1 rests on the axis 2 by the intermediary of bearings 3 and 4. The profile of the wheel rim is suitable to receive a tyre. On the axis 2 is fixed, by a ring 5, a circular plate 6. Around this plate, on its margin, are welded, at their edges, respectively 7—8 and 9—10, two half crowns 11 and 12, for example of thin steel. Facing the half-crown 12 is disposed braking material 13 fixed on the body 14 of the wheel. Facing the half-crown 11 is disposed another braking material 15, fixed on an annular plate 16, placed in a recess 17 formed also in the body of wheel 1.

In the half-crown 12 is led a pipe 18 connected with the outlet of a pump 19 which is, for example, of the gear type. On pipe 18 is mounted, a small hydro-pneumatic accumulator 20 constituted by a cylindrical vessel 21 in which a piston 22 divides a lower chamber 23 filled with liquid, and an upper chamber 24 charged with a gas under pressure. In the half-crown 11—at a point situated close to the discharge of pipe 18 in half-crown 12—is led a pipe 25 which goes to a radiator 26. The circular plate 6 is perforated by holes 27 at a spot diametrically opposed to the exits of pipes 18 and 25 in the half-crowns 11 and 12.

Pump 19 sucks liquid from reservoir 28 by a pipe 29. The exit from radiator 26 is made by pipe 30 connected with the lower extremity of regulator 31.

This regulator comprises a cylindrical body 32 which is divided into two chambers 34 and 35 by an interior partition 33. These chambers are put into communication by orifice 36 in partition 33 and controlled by needle 37. Needle 37 is carried by piston 38 mounted tightly in cylindrical body 32. A spiral spring 39 is interposed between partition 33 and piston 38. Needle 37 has a flange 40, and a spring 41 is interposed between the said flange and piston 38. On the flange 40 there is a circular washer 41a capable of cooperating with an annular seat 42 formed in partition 33. The lower compartment 43, which is limited by piston 38 in chamber 34, is in communication with reservoir 28 by a pipe 60. The upper compartment 45 is connected by a pipe 46 with a transmitting device 47, which comprises a cylindrical body 48, wherein may be displaced a piston 49 providing with the cylinder an annular space 50. In this annular space a tube 51 coming from reservoir 28 terminates. Piston 49 is pierced by a channel 52 capable of putting in communication the annular space 50 and chamber 53 in which tube 46 terminates. This communication may be interrupted by a valve 54 of which the stem 55 carries a rod 56 capable of being displaced in groove 57 of piston 49. This piston is engaged by rod 58 hinged on the brake pedal 59.

The operation of this system is as follows:

When pedal 59 is depressed, in order to apply the brake, the first phase of the movement closes communication between reservoir 28 and chamber 53 by reason of the closing of valve 54. Simultaneously, according to the invention, in the course of this first phase, pump 19 is put in rotation, for instance by its clutching with the motor of the vehicle.

The liquid which pump 19 sucks from reservoir 28 is delivered through pipe 18 to halfcrown 12, then in half-crown 11 through holes 27, arrives at the regulator through pipe 25, and returns to reservoir 28 by tube 60. The orifice 36 of partition 33 is of sufficient diameter to insure that no notable loss of pressure shall result at its passage, in course of this first phase of the movement of pedal 59, in the circulation of the liquid. The liquid is therefore not under pressure in the half-crowns 11 and 12, and wheel 1 turns without the half-crowns being in contact with the braking material 13 and 15.

When the depression of pedal 59 is continued the needle 37 restricts the passage of the liquid through orifice 36; causing the pressure to increase in half-crowns 11 and 12 which then expand and come into contact with brake material 13 and 15; this contact, under pressure, causes friction which ensures the braking of the vehicle. This friction rises in degree as the depression of pedal 59 is continued, the closing of orifice 36 becoming more absolute. The heat caused by the braking is generated at the place of contact of the half-crowns 11 and 12 with the braking materials 13 and 15; by reason of the conductibility of the half-crowns 11 and 12 and of the poor conductibility of materials 13 and 15 the wheel is protected and the heat does not penetrate in it excessively. The interior space in half-crowns 11 and 12 being filled constantly by the liquid, this liquid absorbs the heat which is dissipated into the atmosphere by means of radiator 26. The efficacy of the cooling is such that, with a brake according to the invention, the maximum braking force may be applied without excessive heating of the brake device and of the wheel.

If, when the vehicle is at rest, the driver depresses pedal 59 to its utmost limit the vehicle remains braked. Under this condition the liquid remains under pressure between the partition 33 rendered fluid tight by the cooperation of circular washer 41ᵃ and the tightening ring 42, and on the other hand, is prevented from returning to the reservoir 28 through pipe 18 by a non-return valve 61 situated between pump 19 and the deformable wall.

Figure 2:
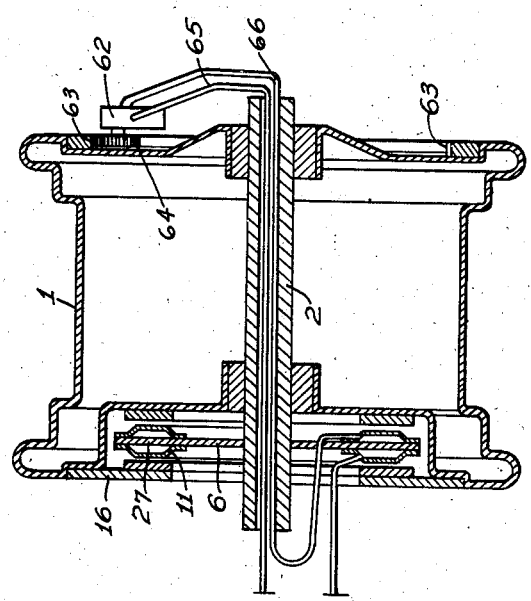
Fig. 2 shows, in axial section, a wheel of modified form furnished with a brake according to the invention, wherein the pump is actuated by the rotation of the wheel.

In the modification according to Figs. 2 and 3 a pump 62 is provided which is actuated not by the motor of the vehicle but by wheel 1 to be braked. To this end the wheel has a toothed crown 63 which engages with a pinion 64 mounted on the shaft of the pump 62. The inlet and outlet tubes of this pump, 65 and 66, are for the crossing of the wheel lodged inside the axle 2. In this modification, during the first phase of the depression of brake pedal 59, the pinion 64 is engaged with the toothed crown 63. In this embodiment, it may be necessary to provide a complementary braking device in order to maintain the blocking of the wheels in case of a prolonged stopping of the vehicle.

Reference is now made to Figs. 4 and 6 relating to another embodiment. In this embodiment axle 2 of the wheel carries on one side of line X—X a disc 67 which terminates, at its periphery in two concentric projections 68 and 69 forming an annular space 70. In this annular space is mounted a sliding half-crown of U form in section formed of thin metal and of which the bottom is situated in front of braking material 73 carried by wheel 1. Two packing rings 74 and 75 are placed in the projections 68 and 69. Springs 76 are attached at one end to the bottom 72 of the half-crown 71 and at the other end on the bottom 77 of annular space 70. This end, which forms part of disc 67, is preferably convex and has numerous cooling ribs 78. On half-crown 71 are lugs 79 received in corresponding recesses 80 provided in projection 69. A similar device is provided on the other side of the wheel, symmetrically in relation to axis X—X.

When the pressure of the liquid in annular space 70 increases, the half-crown 71 is applied at its bottom 72 against braking material 73, thus causing the braking. The lugs 79 prevent the entraining of half-crown 71 by the material 73. The effect of the braking is similar on the other side of the wheel. When the pressure falls in the annular space 70 the half-crown 71 is returned to its position of rest by the action of springs 76.

The ribs 78 assure the cooling of the liquid circulating in annular space 70 which permits the radiation of the heat caused by the braking. If this is not sufficient the liquid issuing from annular space 70 discharges into a radiator, as in the embodiments above described.

The circulation of the liquid may be assured by the device shown diagrammatically on Fig. 6. The liquid arrives at the wheel by tube 81 which discharges into annular space 70. Tube 81 is inclined in relation to the mid-plan of the wheel so that the liquid circulates in the said space in a well-determined direction; a deflecting shield 82 further prevents the movement of the liquid in the opposite direction. After having circulated in the annular space 70 following the circumference of the wheel the liquid is evacuated by tube 83 issuing from the wheel in the immediate vicinity of the tube 81. The liquid is led towards tube 83 by a deflecting shield 84 which is solid with end 77; a part of shield 85 solid with end 72 of half-crown 71 prevents the passage of the liquid between shield 84 and the said end 72.

What I claim as my invention and desire to secure by Letters Patent is:

1. In a brake system, hollow expansible brake shoes, a reservoir for pressure fluid, supply and return connections between said shoes and said reservoir, a power operated pump connected with the supply connection, a control valve interposed in the return connection, a piston for operating said control valve, means for conducting fluid from said reservoir to said piston, and means for varying the pressure of the fluid applied to said piston to operate said control valve.

2. A brake system as claimed in claim 1 characterised by the provision of a non-return valve in the supply connection between the pump and the brake shoes preventing return of the fluid from the shoes to the reservoir.

3. A brake system as claimed in claim 1 wherein said control valve includes means rendered effective in one position of said piston to completely close passage through said return connection.

4. A brake system as claimed in claim 1 characterised by the provision of a non-return valve in the supply connection between the pump and the brake shoes preventing return of the fluid from the shoes to the reservoir, said control valve including means rendered effective in one position of said piston to completely close passage through said return connection.

RENÉ LUCIEN LEVY.